UNITED STATES PATENT OFFICE.

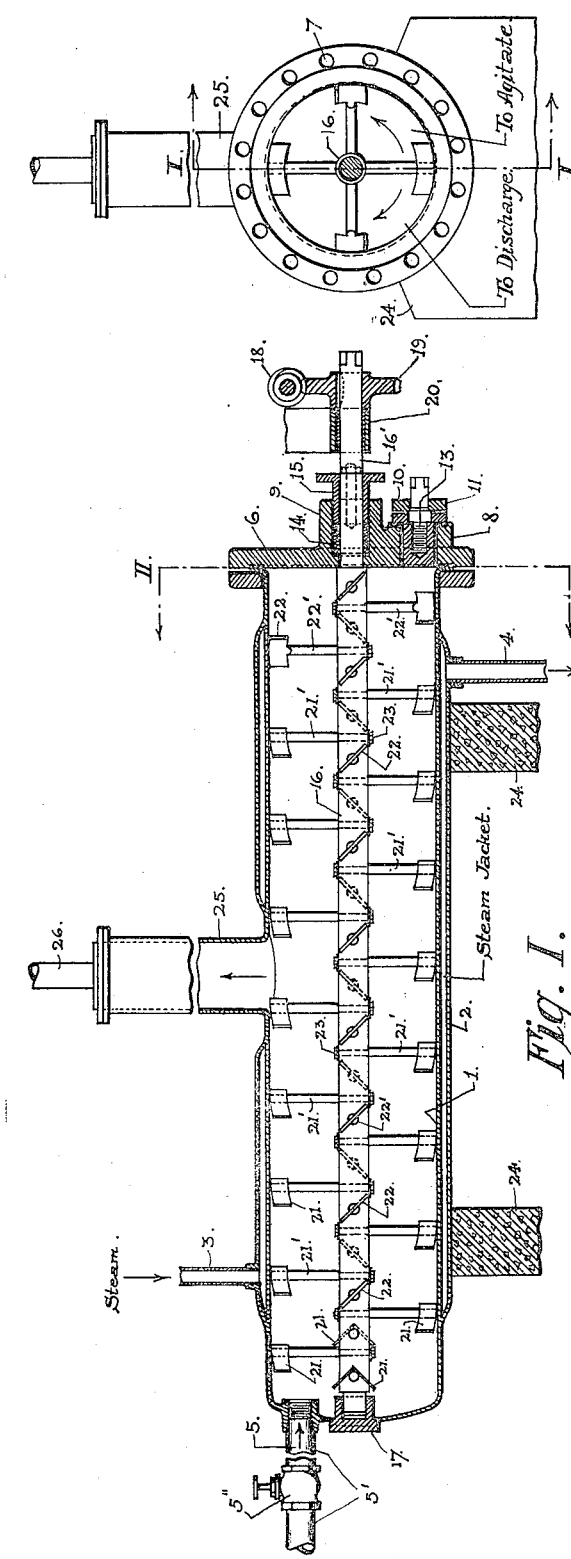

WILLIAM D. MOUNT, OF SALTVILLE, VIRGINIA, ASSIGNOR TO NITROGEN PRODUCTS COMPANY, OF PROVIDENCE, RHODE ISLAND, A CORPORATION OF RHODE ISLAND.

APPARATUS FOR RECOVERING MATERIAL FROM SOLUTION.

1,352,210.  Specification of Letters Patent.  Patented Sept. 7, 1920.

Application filed June 27, 1918. Serial No. 242,331.

*To all whom it may concern:*

Be it known that I, WILLIAM D. MOUNT, a citizen of the United States, residing at Saltville, in the county of Smyth and State of Virginia, have invented certain new and useful Improvements in Apparatus for Recovering Material from Solution, of which the following is a specification.

This invention relates to apparatus for recovering material from solution, and has for its principal object the provision of means for expediting the recovery while at the same time affording a yield of the product in an especially desirable condition.

I have further aimed to overcome the conduit-plugging tendency of the material being recovered; said material during its recovery being in part entrained by the solute being evaporated, to be subsequently deposited as a coating upon the walls of the conduit leading from the evaporator; and some of said material creeping through the aperture through which passes the exhaust gas, and adding to this coating or building-out on the walls of the exhaust conduit, to ultimately choke or plug the latter.

These and other objects of my invention will be hereinafter referred to and the novel combination of elements and means whereby said objects may be attained will be more particularly pointed out in the claims appended hereto.

In the drawing which forms part hereof, I have exemplified a preferred construction; but as I am aware of various modifications and changes which may be made herein without departing from the spirit of my invention, I desire to be limited only to the scope of said claims.

Referring to the drawing, in which like reference characters designate like parts throughout the respective views:

Figure 1 is vertical longitudinal section of the apparatus in question.

Fig. 2 is a section taken on line II—II of Fig. 1.

Fig. 3 is a detail view showing the arrangement of apertures on the head of the evaporator casing.

Fig. 4 is a side view of one of the stirrers or paddles of the agitating device.

Fig. 5 is an end view of said paddle.

Fig. 6 is a fragmentary elevation of one side of the V-shaped blade of said paddle.

Fig. 7 is a side view of one of the paddles of a different type which are alternated with those of the type first mentioned; and Fig. 8 is an end view of the paddle shown in Fig. 7.

The apparatus comprises a casing 1 which may be steam-jacketed as at 2; steam being introduced between the jacket and casing when desired, through pipe 3 and emerging via pipe 4.

The casing is preferably permanently closed at one end, except for the provision of a pipe 5 through which the liquid to be treated is admitted. This pipe is preferably covered with material 5' such as magnesia, which is non-conductive of heat.

The other end is closed by a head 6 which may be secured to the casing by bolts, the holes for which have been designated 7; this closure of course being gas tight.

The head 6 is provided with two bosses, 8 and 9; boss 8 having therein an aperture 8' through which the product may be discharged in manner hereinafter described, this aperture being normally closed by a plug 10 held in place by a strap or yoke 11 suitably bolted to the boss 8; the bolt holes being designated 12. A shouldered screw 13 in the plug is backed out against the yoke 11 to drive the plug firmly against its seat.

The shouldered aperture 9' in boss 9, receives the packing 14 and the gland 15 therefor, whereby the reduced end 16' of the shaft 16 is provided with a substantially gas tight bearing. The rear end of this shaft is journaled in a socket 17 secured in the closed end of the casing.

The shaft 16 may be driven in any suitable manner; but I prefer to rotate it by means of a worm 18 and wheel 19, by means of which it can be turned in either direction, as required.

A bearing 20 is preferably provided adjacent the worm wheel to sustain the thrust upon the latter.

Shaft 16 is preferably provided with two kinds of paddles such as those shown in Figs. 4 and 7; these paddles being alternated for most of the length of the device, except at the rear or closed end of the casing, where I preferably provide several of the duplex or V-shaped paddles 21 in succession and correspondingly, where at the front end, there may be similar succession of the flat paddles 22.

Paddles 21 are mounted on their stems

21', being preferably welded thereto, and may be conveniently made by bending strip or sheet steel at 90°, as shown in Fig. 5.

The strips from which these paddles are made are preferably somewhat arcuate in order that their outer edges may conform to the cylindrical surface of the casing adjacent which they move.

Paddles 22 are similarly integrally or autogenously united to their stems 22'; but respectively each consist merely of a flat arcuate plate or strip as shown in Figs. 7 and 8.

The paddle stems are rigidly connected to the shaft 16 at spaced intervals, as by having their reduced ends received into transverse holes in the shaft, the stems being threaded at their inner ends to permit their shoulders to be drawn up firmly against the shaft by means of nuts 23.

The arrangement of the paddle blades 22 is such that they extend obliquely and preferably at about 45° to the plane of the circles in which their stems rotate. Correspondingly, the respective sides or blades of the duplex paddles are disposed at a similar angle to their planes of movement.

As viewed in Fig. 1, one sees when advancing from the left, a succession of stems 21' in elevation, until nearly at the right hand end of the container; but intermediate these and extending at right angles are the stems of the paddles 22.

The reasons for this arrangement will become apparent in the explanation of the mode of operating the apparatus given hereinafter.

The evaporator rests upon suitable supports 24, of concrete or the like, so that the water resulting from the condensation of steam in the jacket 2 may flow out by gravity.

In the upper portion of the evaporator casing is a dome 25, which may conveniently be extended up some six feet or more; this dome having connected to its upper end a pipe 26 through which the evaporated solvent from the casing 1, may pass on its way to other apparatus for treating the same.

The operation of the apparatus will now be described.

Assuming that the solvent be one which volatilizes at a low temperature, such as liquid ammonia, and that the material to be recovered be, for example, sodium cyanid, in solution in said solvent; this solution will be admitted to the evaporator through the pipe or conduit 5. This conduit is preferably provided with a suitable covering 5', or its equivalent, to prevent heat gaining access to the liquid being delivered to the evaporator; since, unless the solution be quite dilute, there will otherwise be a tendency to deposit some of the cyanid in said conduit, with the result that it will ultimately be choked up.

The casing 1 may be about half filled with the sodium cyanid solution aforesaid and after the conduit 5 has been closed by a valve 5" therein, steam may be admitted to the jacket 2, preferably quite slowly since the ammonia will be driven off thereby with considerable rapidity.

The ammonia vapor evolved enters the dome 25 and there is, of course, some tendency for the cyanid being deposited, to creep up the sides of the drum and also to deposit thereon from the outgoing gas in which it is entrained.

The large diameter of the dome and the height of the smaller conduit 26 above the surface of the liquid being evaporated, prevent the exhaust conduit becoming choked with cyanid for a long time.

After the evaporation of the ammonia is well under way, the agitating mechanism is started, to drive the shaft 16 counterclockwise, as viewed in Fig. 2. By this mode of rotation of said shaft, the material in the casing is effectively agitated without any tendency to push it to any considerable extent toward either end of the casing. In fact the group of duplex paddles at the rear end of the latter and the similar group of paddles 22 at the forward end of the casing, tend to sweep the material being deposited from solution into an extended heap in the middle of the casing where it is pushed first one way and then back by the oppositely acting paddle blades.

That is to say, the forwardly moving face of a given duplex paddle always tends to move the material in contact therewith, toward the front end of the apparatus; but the blade 22 next encountered by any given portion of said material is faced so as to thrust it back toward the V-shaped paddle that it has just left. Thus, the salt being deposited is churned back and forth and when the solvent has been completely removed, will be found to be in the form of a fine powder.

At the moment when the mass being treated becomes pasty, just prior to the removal of nearly all of the solvent, it will be found that considerable power is required to drive the agitator, but at other times comparatively little power is needed.

When the evaporating operation has been completed, the plug 10 is released by turning in its screw and then withdrawing the bolts from the holes 12 to enable the withdrawal of said plug together with its yoke. The agitator is then driven reversely, its shaft being rotated clockwise as viewed in Fig. 2. This brings into play the hitherto substantially unused faces of the duplex paddles, which still therefore, tend to drive the material toward the front end of the casing; while, further, the paddles 22 no longer neutralize this action, but, instead, also now move said material toward the forward end of the device to discharge it through the orifice 8'.

Thus, by driving the agitator in one direction it coacts with the horizontally disposed cylindrical casing, steam-jacket, etc., to yield the product in a particularly desirable form, while when it is rotated in an opposite direction it provides means to unload the product.

Finally, I may add, that if the material being treated be not properly agitated during the removal of especially the last portion of the solvent, the product, if sodium cyanid, will be rather chalk-like in consistency and can normally only be removed from the casing in solid form by breaking it up into lumps.

With the shaft 16 rotating counter-clockwise, for agitation of the charge in the casing, the paddles 21 coact with the paddles 22 to present to the charge what are in effect alternately reversed solution-propelling surfaces; in that a given paddle 21, by its movement, tends to propel the portions of the solution which it encounters, toward one end of the casing, while a paddle 22,—whose path of travel preferably overlaps that of said paddle 21,—immediately thereafter acts to reverse the said tendency, whereby to urge said portions toward the opposite end of the casing. This reversing action has proved in practice to be of particular efficiency in preventing the deposition of cyanid in caked formation. In this connection, I especially desire to emphasize the desirability of thus having the paths of these churning and cutting surfaces at least immediately contiguous to each other, and, preferably, indeed, overlapping; since this eliminates the possibility of leaving much of the material thrown out of solution, undisturbed and, hence, likely to cake.

Having thus described my invention, what I claim is:

1. In apparatus for treating a solution to recover the solute therefrom, the combination of a cylindrical casing, means to support said casing substantially horizontally, means to heat said casing to hasten the evaporation of the solvent therein, combined agitating and unloading means in said casing capable of being driven rotarily in either of two directions, said means having elements, which when driven in one direction tend to agitate the mass being treated by driving portions thereof back and forth betweed adjacent pairs of said elements and when oppositely driven act to unload said casing from one end thereof, means to drive said combined means in either of said directions as required for agitating or unloading, and a removable closure for said end at which the casing is unloaded.

2. In apparatus for treating a solution to recover the solute therefrom, the combination of a casing having a discharging orifice, a removable closure for said orifice, and a rotatable agitating device in said casing comprising different types of paddles, one type of said paddles having faces disposed for engagement with the material being agitated to displace said material toward said orifice irrespective of the direction of rotation of said agitating device, another type of said paddles having faces disposed for engagement with the material being agitated, to displace said material toward said orifice when said agitating device is rotated in one direction but away from said orifice when said device is rotated in the opposite direction.

3. In apparatus for treating a solution to recover the solute therefrom, the combination of a casing having a discharging orifice, a removable closure for said orifice, and a rotatable agitating device in said casing comprising different types of paddles, one type of said paddles having faces disposed for engagement with the material being agitated to displace said material toward said orifice irrespective of the direction of rotation of said agitating device, another type of said paddles having faces disposed for engagement with the material being agitated, to displace said material toward said orifice when said agitating device is rotated in one direction but away from said orifice when said device is rotated in the opposite direction, the superficial extent and disposition of the respective faces of the paddles of both of said types being such that when said device is rotated in said opposite direction the general tendency of the material being treated, for movement axially of said casing, is substantially merely back and forth.

In testimony whereof I have affixed my signature in the presence of two witnesses.

WILLIAM D. MOUNT.

Witnesses:
NANCY SPENCER,
J. H. WATSON.